United States Patent [19]

Sigworth, Jr.

[11] 4,338,991

[45] Jul. 13, 1982

[54] COMBINED SOLAR HEATING AND PASSIVE COOLING APPARATUS

[76] Inventor: Harrison W. Sigworth, Jr., 2 Idyll St., Orinda, Calif. 94563

[21] Appl. No.: 144,661

[22] Filed: Apr. 28, 1980

[51] Int. Cl.³ .............................................. F25B 29/00
[52] U.S. Cl. ........................................ 165/2; 165/32; 165/48 S; 126/415; 126/419; 126/438; 126/450
[58] Field of Search .......................... 165/2, 48 S, 32; 126/415, 419, 428, 438, 450, 451, 452, 436; 4/501

[56] References Cited

U.S. PATENT DOCUMENTS

| | | | |
|---|---|---|---|
| 3,780,385 | 12/1973 | Dunn | 4/501 |
| 3,946,721 | 3/1976 | Keyes et al. | 126/428 X |
| 4,003,365 | 1/1977 | Wiegand et al. | 126/450 X |
| 4,022,187 | 5/1977 | Roberts | 126/415 |
| 4,079,726 | 3/1978 | Voelker | 126/415 |
| 4,082,080 | 4/1978 | Pittinger | 126/428 X |
| 4,098,265 | 7/1978 | Gravely | 126/415 |
| 4,108,156 | 8/1978 | Sitter | 126/415 |
| 4,121,567 | 10/1978 | Carson | 126/415 |
| 4,127,104 | 11/1978 | Greene | 126/450 X |
| 4,128,096 | 12/1978 | Katz | 126/438 |
| 4,237,965 | 12/1980 | Hay | 165/2 |

Primary Examiner—Albert W. Davis
Assistant Examiner—Margaret A. Focarino
Attorney, Agent, or Firm—Phillips, Moore, Lempio & Majestic

[57] ABSTRACT

Hitherto, efficient combined solar heating and passive cooling has not been available in a convenient, modular, relatively simple to install, reasonably priced apparatus. A reservoir (12) has a cover (32) having upper (42) and lower (44) reflective surfaces. Liquid (26) fills the reservoir (12) to a desired level (28). The cover (46) is positionable in either closing relation over the open top (24) of the reservoir (12) with the upper surface (42) reflecting sunlight away from the reservoir (12) or in open relation with the lower surface (44) aligned generally to reflect sunlight towards liquid (26). A normally floating raft (68) substantially covers the top surface (30) of the liquid (26) to retard cool weather daytime evaporation and other heat losses from the liquid (26). The raft (68) may be removed at night during warm weather to provide efficient evaporative and radiative cooling.

17 Claims, 4 Drawing Figures

COMBINED SOLAR HEATING AND PASSIVE COOLING APPARATUS

DESCRIPTION

Technical Field

This invention relates generally to a combined solar heating and passive cooling apparatus and more particularly to an apparatus for heating and cooling water in a reservoir during cool and warm months, respectively.

Background Art

A number of apparatus are known for accomplishing solar heating during cool weather and for providing passive cooling during warm weather. Most of such apparatus is quite bulky thus making it difficult to install upon roofs, overly expensive, or both. Furthermore, such apparatus as is presently available does not properly maximize solar heating during cool weather and passive cooling during warm weather.

One useful apparatus is taught in U.S. Pat. No. 4,128,096, issued Dec. 5, 1978 to S. Katz. The apparatus described in that patent includes a reservoir having a cover with a lower surface which is reflective to thereby increase the amount of radiation impinging upon a matt black covered plate which covers a body of water. While the apparatus is useful for solar heating, it cannot readily accomplish passive cooling in even a marginally effective manner. Also, it requires heat transfer across the matt rather than directly to the water, which is not fully efficient.

U.S. Pat. No. 3,450,192, issued June 17, 1969 to H. R. Hay, discloses the use of an insulative cover over a dwelling having a roof pond or the like to reduce heat absorption during daytime and removal of that cover to allow radiative cooling during nightime. However, the apparatus of this patent does not include any means for increasing the amount of solar radiation accumulated over that impinging on a horizontal surface, in the heating mode, during daytime, and, in the cooling mode, does not minimize heat absorption during daytime.

It would be desirable to have a single apparatus which would be inexpensive, in modular form, and which would provide very efficient solar heating and passive cooling. Such an invention would be particularly useful in many parts of the world, including the southwestern United States where the climate is characterized by dry air and clear skies during the warmer months whereby evaporative and radiative cooling is particularly effective at night.

The present invention is directed to overcoming one or more of the problems as set forth above.

DISCLOSURE OF THE INVENTION

In one aspect of the present invention, a combined solar heating and passive cooling apparatus is set out. The apparatus comprises a reservoir having walls, a bottom, and an open top. A liquid fills the reservoir to a desired level. A cover having peripheral edges and a reflective lower surface is selectively positionable in either closing relation with the top of the reservoir or in open relation with the top of the reservoir with the lower surface aligned generally to reflect sunlight generally towards the liquid. A normally floating raft substantially covers the top surface of the liquid to retard evaporation during daylight operation. The raft may preferably be selectively moved to a location in which the top surface of the liquid is substantially uncovered to favor evaporation of the liquid.

Through utilizing an apparatus as set out above efficient heating can take place during daylight hours since the lower surface of the cover will reflect light usually through the raft and into the liquid. Further, the raft serves to essentially eliminate evaporation of the liquid and to greatly reduce other heat losses from the liquid. At night during cool weather the cover would close to further improve heat retention. During warm weather operation, the cover, which would usually also have a reflective upper surface, would be closed during daytime so as to most efficiently reflect solar radiation away from the reservoir. At night, the cover would be open and the raft would be moved away from the surface of the liquid so that efficient evaporative, radiative and convective cooling of the liquid could occur.

BEST MODE FOR CARRYING OUT THE INVENTION

Figure 1:
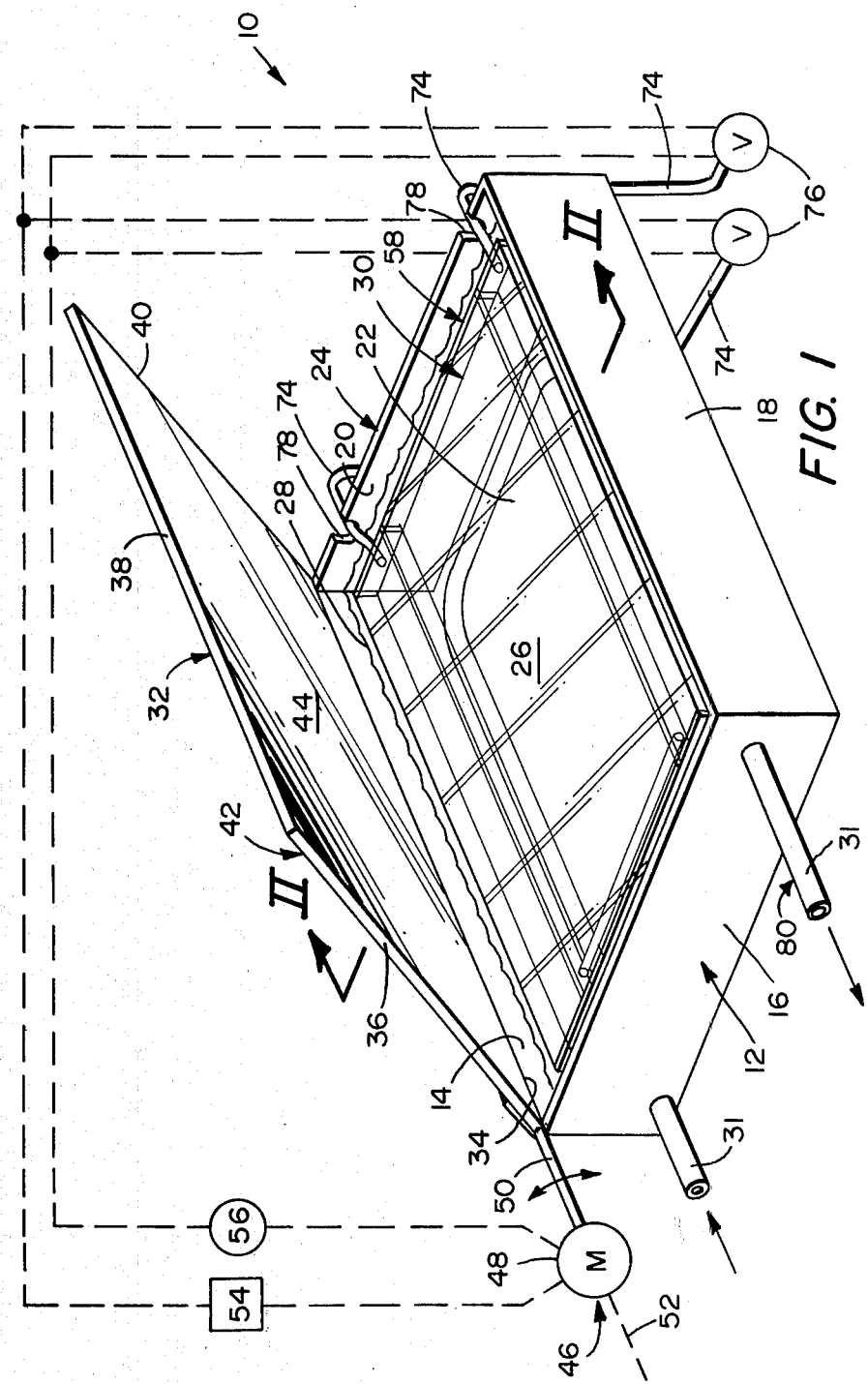
FIG. 1 illustrates, in perspective view, an apparatus in accordance with an embodiment of the present invention.
Figure 2:
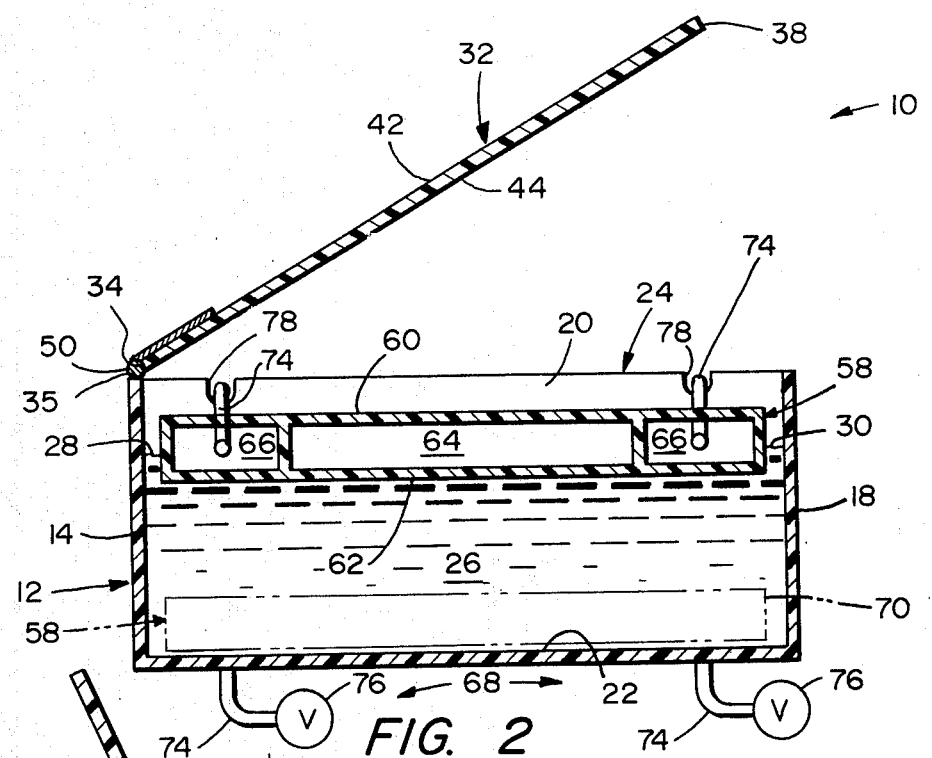
FIG. 2 illustrates a section view taken along the lines II—II of FIG. 1.

Embodiment of FIGS. 1–2

FIG. 1 shows a combined solar heating and passive cooling apparatus 10 in accordance with an embodiment of the present invention. The apparatus 10 includes a reservoir 12 having walls 14,16,18 and 20 (generally insulated walls) and a bottom 22 and having an open top 24. A liquid 26, generally water, fills the reservoir 12 to a desired liquid level 28, the liquid 26 having a top surface 30. Pipes 31 provide for heat exchange with any desired system, for example, a water heating system or pipes positioned in the walls and/or floors of a structure. Water in the reservoir can also be circulated directly.

A cover 32, having peripheral edges 34,36,38 and 40 and having reflective upper 42 and lower 44 surfaces also forms a part of the apparatus 10.

Cover positioning means 46, serves for selectively positioning the cover 32 in either closing relation over the open top 24 of the reservoir 12 with the reflective upper surface 42 aligned generally to reflect sunlight away from the reservoir 12, or in open relation with the open top 24 of the reservoir 12, with the lower reflective surface 44 of the cover 2 aligned generally to reflect sunlight generally towards the liquid 26. The particular cover positioning means illustrated includes a motor 48 which rotates a shaft 50 which defines a generally horizontal pivot axis 52 about which one of the edges 34 of the cover 32 pivots about the top 35 of one 14 of the walls 14,16,18,20 of the reservoir 12. While the particular cover positioning means 46 illustrated will serve the purpose of opening and closing the cover 32, any of a multitude of other cover positioning means may likewise be utilized.

The cover positioning means 46 may be controlled by a differential temperature sensor 54 of a conventional nature and by a clock 56, also of a conventional nature. In particular, the cover positioning means 46 can be made to operate through use of conventional circuitry in response to ambient temperature, water temperature, and time of day to place the cover 32, when ambient daytime temperature, as measured during a selected time span or water temperature, is below a selected temperature, in the aforementioned open relation during a first selected daytime period and in closed relation to the open top 24 during times other than the aforementioned first selected daytime period. For example, if a thermostat in a home being heated by the unit is calling for heat and the outdoor air temperature is below 65° F. (e.g., during cool weather), the unit could operate in the heating mode between 9:00 A.M. and before sunset. When ambient daytime temperatures as measured during the selected time span are above the aforementioned selected temperature or water temperature is undesirably high (e.g., during hot summer months), the cover positioning means 46 can be operated to responsively place the cover 32 in closed relation with the open top 24 of the reservoir 12 during a second selected daytime period, which might be from 10:00 A.M. to sunset and in open relation with the open top 24 of the reservoir 12 during other than the second selected daytime period (e.g., during nights in the summer months).

In accordance with the present invention, a raft 58 fully contacts and substantially covers the top surface 30 of the liquid 26 to retard evaporation and other heat losses from the liquid 26. The raft 58 is preferably of a transparent insulative construction and preferably floats on the top surface 30. More preferably, the raft 58 comprises at least two generally parallel sheets 60 and 62 of spaced apart transparent material peripherally connected together to define an intermediate enclosed space 64 which may be evacuated or gas filled. Full sealing of the enclosed space 64 is not necessary, so long as when it is gas filled the gas is relatively stagnantly held therein and water cannot leak into the space. It is preferred that the material of which the sheets 60 and 62 are formulated has high solar light transmission and low infra red emission characteristics. The topmost 60 of the sheets 60 and 62 preferably has low infrared transmission characteristics. One suitable material for the sheets 60 and 62 is sold under the trademark "Filon". It is normally used as a greenhouse glazing material. When sheets 60 and 62 having the desired characteristics are utilized, the liquid 26 can be efficiently heated and the heat can be efficiently retained. The raft 58 may also include a liquid fillable volume 66, the purpose of which will shortly become apparent.

Raft moving means 68 may also form a part of the apparatus 10. The raft moving means 68 serves for selectively moving the raft 58 to a location 70 in which the top surface 30 of the liquid 26 is substantially uncovered to favor evaporation of the liquid 26 and radiative cooling. Through utilization of the temperature sensor 54 and the clock 56 in a conventional manner, the raft sinking means 68 are preferably operated when ambient daytime temperature as measured during the previously mentioned selected time span is above the previously selected temperature, to sink the raft 58, at least during other than the second elected daytime period.

The raft moving means 68 generally includes sinking means for selectively decreasing the bouyancy of the raft 68 sufficiently for sinking it. Generally liquid, usually water, would be flowed under pressure into the liquid fillable volume 66 in the raft 58 as via one of the flexible tubes 74 passing through one of the valves 76. The other valve 76 would be opened to allow entrapped air to escape. Thus, the tube 74 and valves 76, which are connected to a water supply (not shown), provide means for filling the volume 66 with sufficient liquid to sink the raft 58. As the raft sinks, the flexible (e.g., elastomeric or plastic) tubes 74 are drawn inwardly in slots 78. The tubes and valves 76 likewise serve for emptying the volume 66 when the raft 58 is refloated. It should be noted that it is not necessary to sink the raft 58 to the bottom 22 of the reservoir 12, but only sufficiently far down so that it is below the top surface 30 of the liquid 26. For most efficient radiative cooling, it is desirable, however, to sink the raft 58 as deeply as possible.

It should be noted that conventional heat transfer means 80, such as the pipes 31 passing through the liquid 26 in the reservoir 12, can serve as a heat exchanger for transferring heat to and from any desired system, for example, a house water heating system, pipes in the wall and/or floor of a dwelling or other structure, air heating and cooling coils, etc. Alternatively, the liquid 26 can itself be circulated as part of, for example, a house hot water system. The invention is also useful simply for heating and cooling the reservoir 12.

Figure 3:
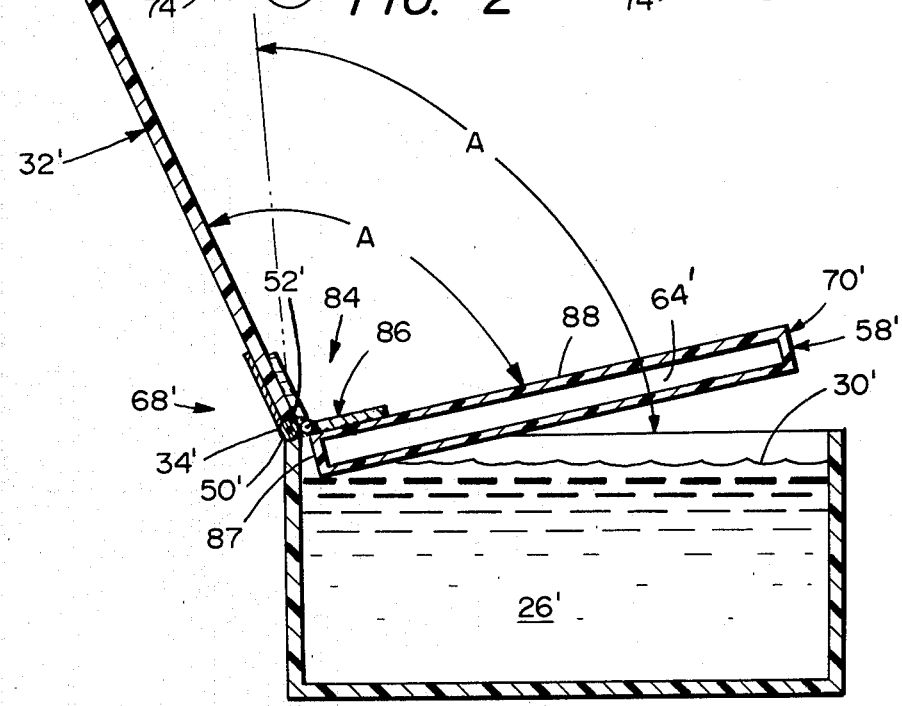
FIG. 3 illustrates, in a section view similar to that of FIG. 2, an alternate embodiment of the present invention.

Embodiment of FIG. 3

FIG. 3 illustrate an embodiment of the invention wherein alternate raft moving means 68' serve for selectively moving a raft 58' to a location 70' in which the top surface 30' of the liquid 26' is substantially uncovered to favor evaporation. The raft moving means 68' includes means 84, for example, a hinge 86 which locks after opening through a selected angle, A, for pivotting the raft 58' about the pivot axis 52' in response to rotation of the cover 32' about the pivot axis 52' through greater than the selected angle A. The hinge 86 is attached to the top 88 of the raft 58' adjacent one peripheral edge 87 thereof and to the cover 32' adjacent the one edge 34' thereof. The hinge 86 can open sufficiently so that the raft 58' can float upon the top surface 30' of the liquid 26' and so that the cover 32' can rotate through angle A. However, when the cover 32' rotates through greater than the angle, A, the hinge 86 locks so that the raft 58' rotates upwardly with the cover 32'. Preferably, the cover 32' is swung fully open whereby the raft 58' fully exposes the top surface 30' of the liquid 26'. Other equivalent structures can also be used.

Figure 4:
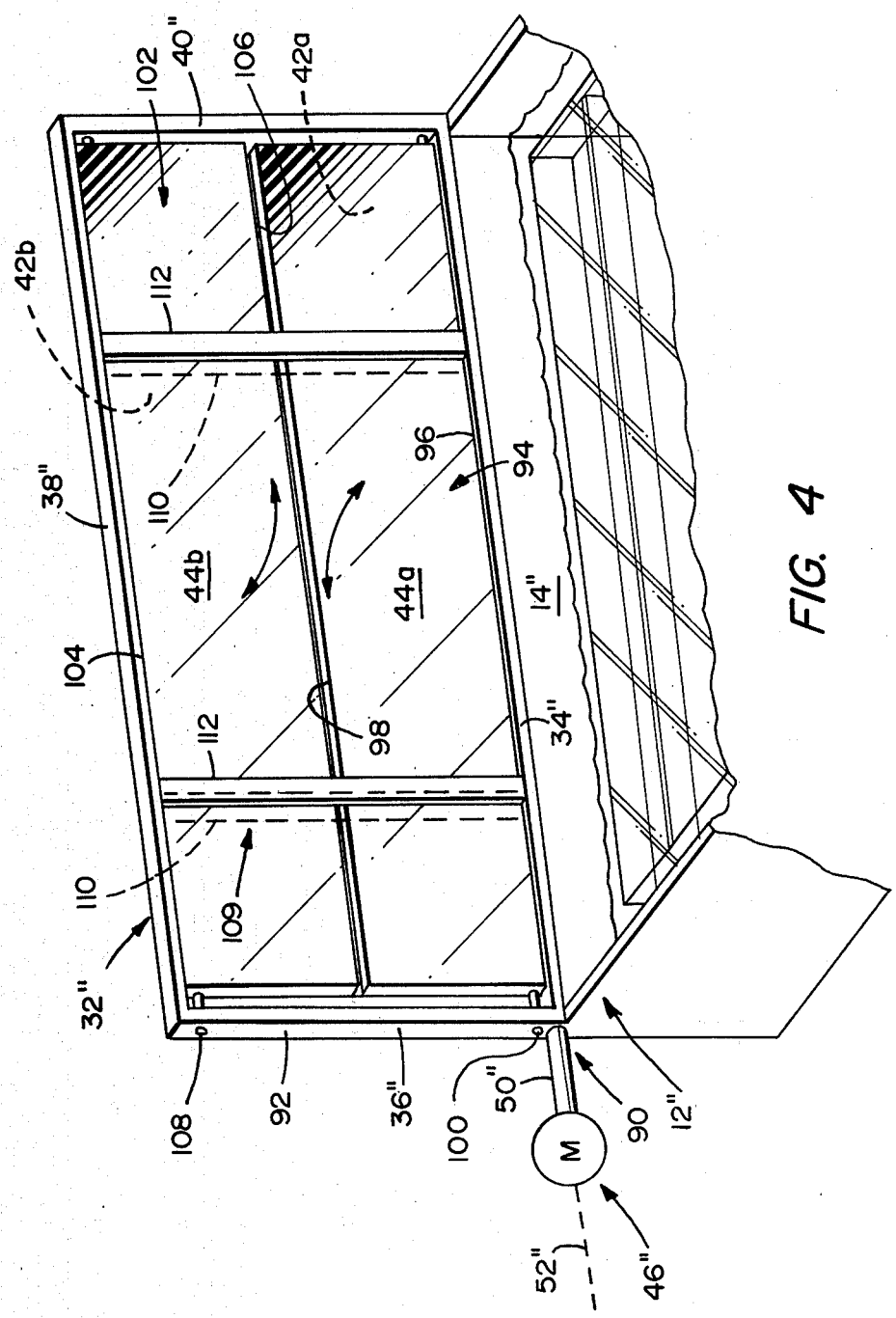
FIG. 4 illustrates, in partial perspective view, another alternate embodiment of the present invention.

Embodiment of FIG. 4

FIG. 4 illustrates alternate cover positioning means 46" which includes a cover 32" in which wind loads are minimized. Pivotal mounting means 90 serve for mounting one edge 34" of the cover 32" to one wall 14" of the reservoir 12" about a generally horizontal pivot axis 52". The cover 32" is unique in that it includes a frame 92 defining the peripheral edges 34",36",38" and 40" and mounted at the one edge 34" by the pivotal mounting means 90 to the one wall 14". A first plate 94, having an upper reflective surface 42a and a lower reflective surface 44a, and having a first edge 96 generally parallel to the one edge 34', and having a second edge 98 generally parallel to the first edge 96, is pivotally mounted at a pivot axis 100 to the one edge 34" of the frame 92. A second plate 102, having an upper reflective surface 42b and a lower reflective surface 44b, has a first edge 104 generally parallel to the one edge 34" and located adjacent another edge 38" of the frame 92, the other edge 38" being generally parallel to the one edge 34", and having a second edge 106 generally parallel to the first edge 104, is pivotally mounted at an axis 108 to the other edge 38" of the frame 92. The second edges 98 and 106 of the first plate 94 and the second plate 102 are adjacent and generally parallel to one another.

An expandable strap structure 109 is attached to extend from the one edge 34" to the other edge 38" of the frame 92. The strap structure 109 includes one strap portion 110 positioned against the upper surfaces 42a' and 44a' and another strap portion 112 positioned against the lower surfaces 44a' and 44b'. Since the strap structure 109 is expandable, the plates 94 and 102 can bulge apart, thus allowing air to flow therebetween in the case of relatively high wind conditions. The cover 32" can be used with either of the rafts 58,58'.

Industrial Applicability

The apparatus of the present invention has a number of uses. For example, the reservoir 12 may be of a nature to fit atop a house or other building so as to provide heating thereof in the winter time and cooling thereof in the summer time. The apparatus can likewise be alternately used to directly heat and cool ponds, swimming pools or other bodies of water without heat exchange; that is, the raft can be positioned upon the pond, pool or the like and used for heating and/or cooling thereof. Through this relatively simple and inexpensive apparatus, very efficient heating and/or cooling are provided at the option of the user. The floating raft concept of the present invention, which raft is generally transparent, is very effective in providing efficiency in the heating modes of operation. If the reservoir is covered by an insulating opaque cover at night, the pond can be very effective as a heat sink.

Other aspects, objects and advantages of this invention can be obtained from a study of the drawings, the disclosure and the appended claims.

I claim:
1. A combined solar heating and passive cooling apparatus (10), comprising:
   a reservoir (12) having walls (14,16,18,20), a bottom (22) and an open top (24);
   a liquid (26,26') filling said reservoir (12) to a desired liquid level (28), said liquid (28) having a top surface (30,30');
   a cover (32,32') having peripheral edges (34,36,38,40) and a reflective lower surface (44);
   cover positioning means (46,46') for selectively positioning said cover (32,32') in either closing relation with said open top (24) or in open relation with said open top (24) with said lower surface (44) aligned generally to reflect sunlight generally towards said liquid (26);
   a raft (58,58') which when positioned on said top surface (30,30') always covers substantially all of said top surface (30,30') sufficiently to retard substantially all evaporation of said liquid (26);
   raft moving means (68,68') for selectively moving said raft (58,58') to a location (70,70') in which said top surface (30,30') is substantially entirely exposed to favor direct evaporation of said liquid (26,26') out of said reservoir (12) and into the surrounding atmosphere;
   wherein said cover positioning means (46,46') operates in response to ambient temperature and to time of day to place said cover (32,32'), when ambient daytime temperature as measured during a selected time span is below a selected temperature, in said open relation during a first selected daytime period and in said closed relation during other than said first selected daytime period and to place said cover (32,32'), when ambient temperature as measured during said selected time span is above said selected temperature, in closed relation during a selected daytime period and in said open relation during other than said second selected daytime period; and
   wherein said raft moving means (68,68') operates, when ambient daytime temperature as measured during said selected time span is above said selected temperature, to remove said raft (68,68') from said top surface (30,30') at least during other than said second selected daytime period.

2. An apparatus (10) as in claim 1, wherein said cover (32) has a reflective upper surface (42) which is aligned generally to reflect sunlight away from said reservoir (12) when said cover (32) is in closing relation with said open top (24).

3. An apparatus (10) as in claim 1, wherein said raft (58,58') is of transparent insulative construction.

4. An apparatus (10) as in claim 1, wherein said raft (58,58') comprises a plurality of generally parallel sheets (60,62) of spaced apart transparent material peripherally connected together to define at least one intermediate enclosed space (64).

5. An apparatus (10) as in claim 4, wherein the material has low infrared emission characteristics and a topmost (60) of said sheets also (60,62) has low infrared transmission characteristics.

6. An apparatus (10) as in claim 1, wherein said cover positioning means (46') includes:
   means (52') for pivotally mounting one (34') of said edges (34',36,38,40) of said cover (32') to one (14') of said walls (14',16,18,20) of said reservoir (12) about a generally horizontal pivot axis (52'); and
   wherein said raft moving means (68') includes:
   means (84) for pivotting said raft (58') about said pivot axis (52') in response to rotation of said cover (32') about said pivot axis (52') through greater than a selected angle A.

7. An apparatus (10) as in claim 1 further including:
   means (80) for transferring heat to and from said liquid (26).

8. An apparatus (10) as in claim 1, wherein said cover (32) has a reflective upper surface (42) which is aligned generally to reflect sunlight away from said reservoir (12) when said cover (32) is in closing relation with said open top (24).

9. A combined solar heating and passive cooling apparatus (10), comprising:
   a reservoir (12) having walls (14,16,18,20), a bottom (22) and an open top (24);
   a liquid (26) filling said reservoir (12) to a desired liquid level (28), said liquid (26) having a top surface (30);
   a cover (32) having peripheral edges (34,36,38,40) and a reflective lower surface (44);
   cover positioning means (46,46') for selectively positioning said cover (32,32') in either closing relation with said open top (24) or in open relation with said open top (24) with said lower surface (44) aligned generally to reflect sunlight generally towards said liquid (26);
   a raft (58,58') which when positioned on said top surface (30) always covers substantially all of said surface (30) sufficiently to retard substantially all evaporation of said liquid, said raft (58) normally floating upon said liquid (26); and raft moving means (68) for selectively moving said raft (58) to a location (70) in which said top surface (30) is substantially entirely exposed to favor direct evaporation of said liquid (26) out of said reservoir (12) and into the surrounding atmosphere said raft moving means (68) comprising sinking means (72) for selectively decreasing the buoyancy of the raft (58) sufficiently for sinking the raft (58).

10. An apparatus (10) as in claim 9, wherein the raft (58) includes a liquid fillable volume (66) and wherein said sinking means (72) includes means (78) for filling said volume (66) with sufficient liquid to sink said raft (58).

11. An apparatus (10) as in claim 9, wherein said raft (58,58') is of transparent insulative construction.

12. An apparatus (10) as in claim 9, wherein said cover (32) has a reflective upper surface (42) which is aligned generally to reflect sunlight away from said reservoir (12) when said cover (32) is in closing relation with said open top (24).

13. A combined solar heating and passive cooling apparatus (10), comprising:

a reservoir (12") having walls (14",16",18",20"), a bottom (22) and an open top (24);

a liquid (26) filling said reservoir (12") to a desired liquid level (28), said liquid (26) having a top surface (30);

a cover (32") having peripheral edges (34",36",38",40") and a reflective lower surface (44");

cover positioning means (46") for selectively positioning said cover (32") in either closing relation with said open top (24) or in open relation with said open top (24) with said lower surface (44") aligned generally to reflect sunlight generally toward said liquid (26);

a raft (58,58') which when positioned on said top surface (30) always covers substantially all of said top surface (30) sufficiently to retard substantially all evaporation of said liquid (26);

wherein said cover positioning means (46") includes:

pivotal mounting means (90) for pivotally mounting one (34") of said edges (34",36",38",40") of said cover (32") to one (14") of said walls (14",16",18",20") of said reservoir (12") about a generally horizontal pivot axis (52"); and wherein said cover (32") includes:

a frame (92) defining said peripheral edges (34",36",38",40") and mounted at said one edge (34") by said pivotal mounting means (90) to said one wall (14");

a first plate (94) having a first edge (97) generally parallel to said one edge (34") and having a second edge (98) generally parallel to said first edge (96), said first edge (96) being pivotally mounted to said one edge (34") of said frame (92);

a second plate (102) having a first edge (104) generally parallel to said one edge (34") and adjacent another edge (38") of said edges (34",36",38",40") of said frame (92), said other edge (38") being generally parallel to said one edge (34"), and having a second edge (106) generally parallel to said first edge (104), said first edge (104) being pivotally mounted to said other edge (38") of said frame (92), said second edges (98,106) of said first (94) and second (102) plates being adjacent and generally parallel to one another; and an expandable strap structure (108) attached to extend from said one edge (34") to said other edge (38") of said frame (92), one strap portion (110) being positioned against said upper surface (32") and another strap portion (112) being positioned against said lower surface (44").

14. A method of selectively heating and cooling utilizing solar energy, comprising:

fully contacting a raft (58) with and covering substantially all of an entire top surface (30) of a liquid (26) in a reservoir (12) having an open top (24) sufficiently to retard substantially all evaporation of said liquid;

during daytime periods of cool weather arranging a reflective cover (32) to reflect sunlight downwardly on to said raft (58);

during nighttime hours during cool weather positioning said cover (32) in closing relation atop said reservoir (12) to retain heat therein;

during daytime periods during warm weather, positioning said cover (32) in covering relation over said open top (24) of said reservoir (12) with an upper reflective surface thereof serving to reflect sunlight away therefrom;

during nighttime hours during warm weather, positioning said cover (932) in open relation with said open top (24) of said reservoir (12); and during nighttime hours during warm weather, moving said raft (58) from contact with said top surface (30) of said liquid (26) sufficiently to allow substantially unimpaired evaporation of said liquid.

15. The method as set out in claim 14, wherein said fully contacting step comprises floating said raft (58) upon said top surface (30).

16. The method as set out in claim 15, wherein said removing of said raft (58) comprises sinking said raft (58) to below said top surface (30).

17. The method as set out in claim 15, wherein said removing of said raft (58') comprises rotating said raft (58') about one edge (87) thereof sufficiently to expose said top surface (30').

* * * * *